US009407755B1

(12) United States Patent
Koller et al.

(10) Patent No.: US 9,407,755 B1
(45) Date of Patent: Aug. 2, 2016

(54) MOBILE COMMUNICATION DEVICES COLLABORATIVE POWER MANAGEMENT

(71) Applicant: Sprint Communications Company L.P., Overland Park, KS (US)

(72) Inventors: Gary Duane Koller, Overland Park, KS (US); Mark Douglas Peden, Olathe, KS (US); Raymond E. Reeves, Overland Park, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/619,640

(22) Filed: Feb. 11, 2015

(51) Int. Cl.
*H04M 1/73* (2006.01)
*H04W 52/02* (2009.01)
*H04W 4/00* (2009.01)
*H04W 88/06* (2009.01)

(52) U.S. Cl.
CPC ............... *H04M 1/73* (2013.01); *H04W 4/008* (2013.01); *H04W 52/0209* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 8,276,010 B2 * | 9/2012 | Vavilala | ................. | G06F 1/3203 709/233 |
| 8,280,456 B2 * | 10/2012 | Hackborn | ............ | G06F 11/3409 348/189 |
| 8,397,087 B1 * | 3/2013 | Gardner | ................... | G06F 1/329 713/300 |
| 9,003,017 B2 * | 4/2015 | Gerber | .................. | G06F 11/302 709/224 |
| 9,015,513 B2 * | 4/2015 | Murawski | ......... | H04W 52/0261 713/300 |
| 9,086,875 B2 * | 7/2015 | Harrat | .................... | G06F 1/3203 |
| 9,172,117 B2 * | 10/2015 | Katpelly | ............... | G06F 1/3203 |
| 9,176,841 B2 * | 11/2015 | Kansal | ................ | G06F 11/3062 |
| 2005/0209998 A1 * | 9/2005 | Takata | ..................... | G06F 21/10 |
| 2010/0178953 A1 * | 7/2010 | Blewett | ............... | H04L 12/5895 455/550.1 |
| 2014/0189389 A1 * | 7/2014 | Lynar | ...................... | G06F 1/329 713/320 |
| 2014/0244190 A1 * | 8/2014 | Berman | ................. | G01R 21/00 702/61 |

* cited by examiner

*Primary Examiner* — Tuan A Tran (57) ABSTRACT

A mobile phone that coordinates power management across multiple communication devices. The mobile phone comprises a processor, a memory, long-range and short-range radio transceivers, and an application. When executed by the processor, the application receives device power reserve and device application usage information via the short-range radio transceiver from a portable communication device, and transmits the device power reserve and device application usage information, a phone power reserve and a phone application usage information via the long-range radio transceiver to a server computer. The application further receives power management instructions via the long-range radio transceiver from the server, creates a device power management command based on the power management instructions, transmits the device power management command via the short-range radio transceiver to the portable communication device, and configures the mobile phone to manage a battery power reserve of the mobile phone based on the power management instructions.

20 Claims, 7 Drawing Sheets

MOBILE COMMUNICATION DEVICES COLLABORATIVE POWER MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones have become common in the United States. About 90% of adults in the United States own at least one mobile phone. Additionally, wireless communication coverage (e.g., cellular wireless coverage) within the 48 contiguous states is nearly ubiquitous: cellular wireless communication service is typically available everywhere with the exception of remote rural or mountainous areas where human population is very low. Smart phones are mobile phones that have additional capabilities, for example more advanced computing capability and/or advanced connectivity than traditional cell phones (i.e., feature phones). In addition to providing customary voice services, smart phones may operate as mobile computing platforms, executing applications that may be unrelated to voice or data communication. For example, a smart phone may execute a GPS application that allows the user to input an address and then provides the user with directions for navigating to that address. A smart phone may execute a web browser application and provide user access to the Internet. A smart phone may promote the user downloading and installing new applications (e.g., third party applications) onto the smart phone and then executing those applications. A smart phone may have a large and/or high resolution touch screen color display. In some surveys, as many as 3 out of 5 mobile phones in the United States are now smart phones, and that proportion is increasing. Smart phones provide greater functionality to users. Smart phones may provide new revenue opportunities to mobile communication service providers, on-line merchants, and third party application developers.

New portable electronic devices are being developed and becoming commercially available to the public. Some of these portable electronic devices are capable of connecting to the cellular communication network. Some of these portable electronic devices are capable of connecting to short range radio access points such as WiFi access points or Bluetooth® access points. Some of these portable electronic devices are able to connect to both the cellular communication network and to short range radio access points. These portable electronic devices may be headset computers, wristwatch computers, wearable computers, fitness trackers, or computer inserts, such as electronic inserts that may fit into running shoes. In some cases, these portable electronic devices may establish wireless communication links with a user's mobile phone, and the mobile phone and one or more portable electronic devices belonging to the user may collaborate to provide service to the user.

SUMMARY

In an embodiment, a mobile phone that coordinates power management across multiple communication devices is disclosed. The mobile phone comprises a processor, a memory, a long-range radio transceiver, a short-range radio transceiver, and an application stored in the memory. When executed by the processor, the application receives a device power reserve information via the short-range radio transceiver from a portable communication device, wherein the portable communication device is different from the mobile phone and receives a device application usage information via the short-range radio transceiver from the portable communication device. The application further transmits the device power reserve information, the device application usage information, a phone power reserve information, and a phone application usage information via the long-range radio transceiver to a data analysis server computer. The application further receives power management instructions via the long-range radio transceiver from the data analysis server computer, creates a device power management command based on the power management instructions, transmits the device power management command via the short-range radio transceiver to the portable communication device, and configures the mobile phone to manage a battery power reserve of the mobile phone based on the power management instructions.

In another embodiment, a method of managing power collaboratively among a plurality of associated mobile communication devices is disclosed. The method comprises receiving information from a plurality of unassociated mobile phones by a mobile device collaborative power management server computer, wherein the information comprises information about a battery power level of a mobile phone, about applications on the mobile phone, about a battery power level of a mobile communication device associated with the mobile phone, and about applications on the mobile communication device associated with the mobile phone and analyzing the information from the mobile phones by the server computer to determine battery power dissipation rates for different models of mobile phones based on applications on the mobile phones and to determine battery power dissipation rates for different models of mobile communication devices based on applications on the mobile communication devices. The method further comprises receiving a message by the server computer from one of the unassociated mobile phones, where the message comprises an indication of a current battery power level of the mobile phone and an indication of a current battery power level of a mobile communication device associated with the mobile phone, where the message indicates that the mobile phone is ready to enter a pre-defined power management mode, where the pre-defined power management mode is associated with a pre-defined set of power management rules stored by the server computer wherein the rules are associated with the mobile phone and, in response to the message, creating a collaborative power management command based on the current battery power level of the mobile phone, based on the applications on the mobile phone, based on the current battery power level of the mobile communication device associated with the mobile phone, and based on the applications on the mobile communication device associated with the mobile phone. The method further comprises transmitting the collaborative power management command to the mobile phone, whereby the server computer promotes the mobile phone managing power across the mobile phone and the mobile communication device associated with the mobile phone.

In an embodiment, another method of collaboratively managing battery power across multiple portable communication devices is disclosed. The method comprises collecting battery power level information from a portable communication device by a mobile phone associated with the portable communication device and collecting information about applications loaded on the portable communication device by the mobile phone. The method also comprises transmitting information about the battery power level of the portable communication device and about the applications loaded on the portable communication device by the mobile phone to a data analysis server computer, transmitting information about a battery power level of the mobile phone and about applications loaded on the mobile phone by the mobile phone to the data analysis server computer, and transmitting information about the mobile phone entering a different power management operation mode by the mobile phone to the data analysis server computer, where the different power management operation mode is one of a plurality of power management modes pre-defined in a power management profile associated with the mobile phone stored at the server. The method further comprises receiving a collaborative power management command by the mobile phone from the data analysis server computer and transmitting a command to the portable communication device by the mobile phone to one of disable an application loaded on the portable communication device and to reduce a frequency of communications by an application loaded on the portable communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile phone devices have accustomed many users in the United States to have ubiquitous communications connectivity. In the future, many users are expected to have multiple portable electronic devices that they use for various purposes. For example, a user may carry a mobile phone, wear one or more fitness tracker electronic devices, and possibly carry one or more additional wearable or portable electronic devices at the same time or at different times. Some of the portable electronic devices have small batteries that have relatively short service cycles before their battery is discharged and the device becomes disabled. The present disclosure teaches a system to collaboratively manage power reserves among a mobile phone and one or more portable electronic device, for example a mobile phone and a portable electronic device owned and used by a single user.

In an example use scenario, a mobile communication subscriber may go running for exercise. The subscriber may desire to carry his or her mobile phone and also have the use of electronic fitness trackers that execute an application that monitors one or more parameters of a run. For example, the application on the electronic fitness tracker may determine a distance run, an estimated number of calories burned, an average speed over the run, a current position of the runner, a map of the run, and other parameters. Alternatively, the electronic fitness tracker may collect and store data that may be downloaded later after the run is complete and analyzed by a separate processor such as a desktop computer or laptop computer to determine the distance run, the estimated number of calories burned, the average speed over the run, the map of the run completed, and other parameters of the completed run. The user may customarily run for about 90 minutes. A power management client on the mobile phone, in response to the user indicating that he or she is going on a run, communicates with a power management application on a server computer. The power management application may be referred to in some contexts as a power management hub. The client application informs the server application of the current power reserve of the phone, the current power reserve of the electronic fitness tracker, applications executing on the phone and the fitness trackers, and the time duration during which the phone and fitness tracker will be unable to recharge their respective batteries. The server application may determine that both the phone and the fitness tracker can operate in a normal operational mode during the time interval of the run.

On the other hand, the server application may determine that the electronic fitness tracker will exhaust its battery power reserve before the run is completed. In this case, the server application may send a power management command to the mobile phone, and the mobile phone may send a corresponding power management command to the electronic fitness tracker. The power management command may instruct the mobile phone and/or the electronic fitness tracker to operate in a power conservation mode that may allow the electronic fitness tracker to continue to operate for the time duration of the run.

For example, the power command may instruct the electronic fitness tracker to reduce a clock frequency of a CPU of the fitness tracker, to disable some of the functionality of one or more applications that execute on the electronic fitness tracker (for example, to disable mapping a position of the electronic fitness tracker which may rely upon a GPS radio receiver that consumes relatively high amounts of power), to handshake less frequently via a short-range radio transceiver with the mobile phone, to power down one or more hardware components of the electronic fitness tracker, and/or other power conservation behaviors. The power command may instruct the electronic fitness tracker to not run applications in the background and/or to not send notifications with the exception of high priority items.

The mobile phone and one or more of a portable communication device the user takes or wears may have one or more of the same applications or functionalities. Thus, there may be redundancy or overlapping of functionality among the mobile phone and the portable communication devices. The power management server application may identify this redundancy and generate a command that reduces or eliminates this redundancy, for example by commanding the mobile phone to retain a first functionality and disable or deactivate a second functionality and commanding the portable communication device to disable or deactivate the first functionality and retain the second functionality. In this way, the user would continue to have the benefits of both the first and second functionality but would reduce aggregate battery consumption on the mobile phone and the portable communication device.

In an example scenario, a user may plan to leave his or her mobile phone home or in the car and wear only an electronic fitness tracker and/or a smart wrist watch (i.e., a wrist watch with cellular communication functionality). The server may send guidance to the user, via a notification on the mobile phone, advising the user to carry the phone because otherwise the electronic fitness tracker and/or smart wrist watch would be expected to fully discharge its battery and shut down. By contrast, in this scenario, if the mobile phone is carried it may execute applications and provide communications connectivity and allow corresponding applications on one or more of the electronic fitness tracker and/or smart wrist watch to be deactivated and communication hardware components to be powered off (e.g., a cellular communication radio transceiver may be powered off).

In an embodiment, the server receives power consumption reports from a large number of different mobile phones and portable electronic devices, and the server application may analyze these reports to derive power consumption rates for phones and devices under different operational regimes. When the server application receives a message from a mobile phone requesting power management direction, the server application can analyze the message and provide a power management command to the mobile phone based on the historical power consumption rates of like phones and devices and like operational regimes.

In an embodiment, the power management client on the mobile phone may be configured to receive rules from the power management application executing on the server computer, for example rules that define under what conditions different power management actions ought to be taken. In this embodiment, the power management client on the mobile phone may be able to make power management decisions autonomously from the power management application executing on the server computer, for example when the mobile phone may not have connectivity to the server computer. The power management client on the mobile phone may determine power levels, power consumption rates, priority of applications, and the like and, based on the rules configured in the client by the power management application executing on the server computer, autonomously determine power management regimes given current conditions and user plans. It is understood that the rules provided by the power management application executing on the server computer to the power management client on the mobile phone can be adapted to the specific make and model of the mobile phone and of collaborating user devices such as the fitness tracker device used in the example above. Additionally, these rules can be determined by the power management application executing on the server computer in the context of accumulated data about power management experiences from other devices.

Additionally, the power data can be analyzed to develop power efficiency scores for applications and/or phones. The power scores could be shared with third party developers of applications, so developers could adapt their applications to be more efficient. The power scores could be shared with original equipment manufacturers (OEMs) of mobile phones and of portable communication devices, so OEMs could adapt their electronic devices to be more efficient. Power scores could be publicly disseminated, so users could choose to download relatively power efficient applications and to avoid relatively power inefficient applications. Further, a service provider could provide incentives to subscribers to select power efficient applications and avoid power inefficient applications. The service provider could analyze and accumulate metrics on total power savings realized through this information distribution across its subscriber base and track this roll-up metric in keeping with a company mission of being an environmentally friendly corporation.

Figure 1:
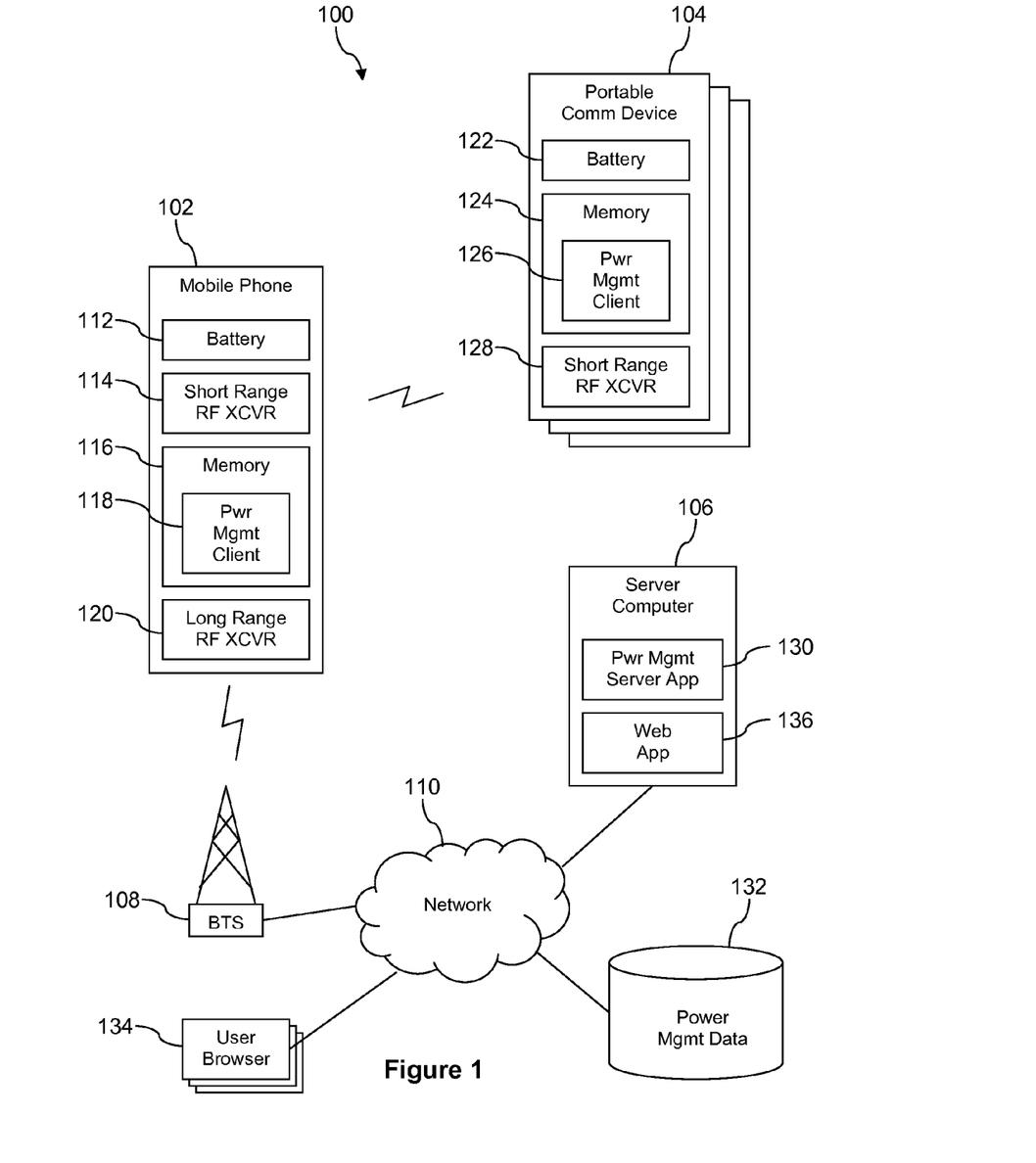
FIG. 1 is a block diagram of a communication system according to an embodiment of the disclosure.

Turning now to FIG. 1, a system 100 is described. In an embodiment, the system 100 comprises a mobile phone 102, one or more portable communication devices 104, a server computer 106, a base transceiver station (BTS) 108, and a network 110. The mobile phone 102 may comprise a battery 112, a short range radio transceiver 114, a memory 116 storing a power management client (e.g., a computer program or application) 118, and a long range radio transceiver 120. The portable communication device 104 may comprise a battery 122, a memory 124 storing a power management client (e.g., a computer program or application), and a short range radio transceiver 128. In some embodiments, one or more of the portable communication devices 104 may comprise a long range radio transceiver and may be operable to establish a wireless communication link with the BTS 108. The mobile phone 102 may be any of a feature phone, a smart phone, a personal digital assistant (PDA), or a media player. In a preferred embodiment, the mobile phone 102 is a smart phone. The portable communication device 104 may be any of a headset computer (e.g., GOOGLEGLASS), a wrist phone, a wrist computer, a smart watch, a fitness tracker, a wearable computer, or other device. It is understood that the portable communication device category is in very rapid expansion at the present time, and that it is not feasible to exhaustively enumerate all the devices that are contemplated to correspond with the portable communication device 104 now and in the near future.

As used herein, a short range radio transceiver may have a maximum range of about 200 feet, about 300 feet, or about 500 feet. Examples of known short range radio transceivers are WiFi radio transceivers and Bluetooth® radio transceivers, but the short range radio transceiver 114 and 128 of the present disclosure should not be limited to only these short range radio protocols. As used herein, a long range radio transceiver may have a maximum range of about 2 miles, about 5 miles, or about 10 miles. Examples of known long range radio transceivers are radio transceivers that operate according to one or more of a code division multiple access (CDMA), a long term evolution (LTE), a global system for mobile communication (GSM), or a worldwide interoperability for microwave access (WiMAX) wireless communication protocol. It is understood, however, that the teachings of the present disclosure may apply to mobile phones 102 that have a long range radio transceiver 120 that operates according to a different wireless communication protocol and that the long range radio transceiver 120 should not be limited to only CDMA, LTE, GSM, and WiMAX. In some contexts, long range radio transceivers may be referred to as cellular communication transceivers. It is understood that the operational range of the short range radio transceiver and a long range radio transceiver, as defined herein, can overlap. For example, in an embodiment, both a short range radio transceiver and a long range radio transceiver may be able to maintain a wireless communication link over a distance of about 200 feet.

The short range radio transceivers 114, 128 may establish a wireless communication link with each other, promoting the mobile phone 102 and the portable communication device 104 communicating with each other, for example promoting the power management client 118 of the mobile phone 102 communicating with the power management client 126 of the portable communication device 104. The long range radio transceiver 120 may establish a wireless communication link with the BTS 108 according to one or more of CDMA, LTE, GSM, WiMAX, and/or other radio communication protocols. The BTS 108 provides connectivity of the mobile phone 102 to the network 110. The network 110 comprises one or more private networks, one or more public networks, or a combination thereof.

The server computer 106 comprises a power management server application 130. In some contexts, the power management server application 130 and/or the server computer 106 may be referred to as a power management server or a power management hub. In an embodiment, the system 100 further comprises a battery power life data store 132. The battery power life data store 132 may store data and/or reports of battery usage, device information, and application information received from large numbers of mobile phones 102 and portable communication devices 104. For example, the data store 132 may store data associated with tens of thousands, hundreds of thousands, or millions of wireless communication service subscribers.

It is understood that the system 100 may comprise any number of mobile phones 102, portable communication devices 104, and BTSs 108. While a single server computer 106 is shown in FIG. 1, it is understood that a plurality of computers may provide the functionality of a power management server as described herein. Said in another way, in an embodiment, the role of a power management server is provided by a computer system that comprises a plurality of computers. Computers and computer systems are described further hereinafter. In an embodiment, the role of the power management server may be supported in a cloud computing environment.

In an embodiment, the power management server application 130, the power management client 118 on the mobile phone 102, and the power management client(s) 126 on the portable communication device(s) 104 collaborate to manage power reserves of the battery 112 on the mobile phone 102 and the battery 122 on the portable communication device 104 during selected use scenarios. When the user of the phone 102 and the devices 104 is at home or in an office, the user can be expected to charge the phone 102 and/or the devices 104 when needed. If, for example, the battery 112 of the mobile phone 102 drops to an unusable level and the phone shuts off, the user need only find their charger and plug the phone into the charger. This scenario may not constitute a selected use scenario.

During selected use scenarios, however, charging the battery 112, 122 may not be feasible, for example when the user is running for tens of minutes or for more than an hour, when the user is attending a sporting event such as a child's soccer game, or when the user is attending an outdoor family reunion. In an embodiment, the power management client 118 on the mobile phone 102 can be activated by the user, and a user interface can be presented on a display of the mobile phone 102. The user may identify a period of time that he or she will be unable to recharge the mobile phone 102 and the portable communication device 104.

In an embodiment, the user may be able to identify or select, using the user interface of the power management client 118, a particular kind of activity and parameters related to the activity. For example, the user may be able to identify a running activity and a distance estimated to be traveled during the run. The user may identify if he or she will carry the mobile phone 102 during the activity and/or carry one or more of the devices 104. Said in another way, the user may identify the phone 102 and/or the devices 104 that will be used and for which collaborative power management is desired during the activity. In some circumstances, the user may leave his or her mobile phone 102 in the car or at home and only carry the portable communication device 104, such as a headset computer and/or an electronic fitness tracker.

Having provided these inputs to the power management client 118, the user may select for the client 118 to begin collaborative power management. The power management client 118 on the mobile phone 102 may request the power management client 126 on the portable communication device 104 to report the present power reserve of the battery 122 of the device 104, via a wireless communication link established between the short range radio transceivers 114, 128. The power management client 118 on the mobile phone 102 may request the power management client 126 on the portable communication device 104 to report active applications and active hardware components on the device 104. The power management client 118 on the mobile phone 102 may determine a present power reserve of the battery 112 of the mobile phone 102. The power management client 118 on the mobile phone 102 may identify active applications and active hardware components on the phone 102.

The power management client 118 on the mobile phone 102 may then transmit a request via the long range radio transceiver 120 to the BTS 108, from the BTS 108 to the network 110, and from the network 110 to the power management server application 130 to provide collaborative power management guidance or commands to the mobile phone 102. The request transmitted by the power management client 118 to the power management server application 130 may comprise the information on the present power reserves of the batteries 112, 122 as well as the planned activity and any parameters of the activity that the user may have input. The request may further comprise information about applications and/or hardware components that are active on the devices 104 and/or the mobile phone 102.

The power management server application 130 accesses the battery power life data store 132 to obtain historical information germane to the collaborative power management scenario defined by the request received from the mobile phone 102. The historical information may be individual reports of power usage, phone models, device models, applications active, hardware components active. Alternatively, the historical information may be summarizing information that comprises condensed information, for example averages of power dissipation rates based on phone models, device models, battery power reserves, active applications, and/or active hardware components.

Based on the information provided in the request from the mobile phone 102 and based on the historical information accessed from the data store 132, the power management server application 130 generates a collaborative power management command and sends this command to the power management client 118 on the mobile phone 102. The power management server application 130 may take into consideration that the same functionality may be provided by two or more of the mobile phone 102 and the one or more devices 104, and generate a power management command that reduces or eliminates redundancy of functionality among the phone 102 and the devices 104. Redundant functionality may also be referred to in some contexts as overlapping functionality.

Part of the power management command may comprise a notification to the mobile phone 102 to present a message or notification to the user of the phone 102. For example, the power management command may urge the user to carry his or her mobile phone 102 if they were planning on leaving the phone at home or in the car. In response to seeing this notification, the user may complete another interaction with the user interface and revise the power management collaboration scenario he or she had previously defined, for example noting that he or she will carry the mobile phone 102 on the run.

The power management server application 130 may further determine a current state of the cellular wireless communication network, for example by sending a request that information to another server in the wireless communication service provider's network. The power management server application 130 optionally generates the collaborative power management command further based on the current state of the cellular wireless communication network or a portion of the cellular wireless communication network that affects the mobile phone 102 and/or the portable communication devices 104.

The power management client 118 on the mobile phone 102 processes the collaborative power management command received from the power management server application 130. In an embodiment, the collaborative power management command embeds explicit commands for one or more of the portable communication devices 104. In this case, the power management client 118 on the mobile phone 102 transmits these explicit commands to the devices 104. Alternatively, in an embodiment, the power management client 118 is responsible for interpreting the collaborative power management command received from the power management server application 130 and for creating appropriate commands to send to the devices 104 based on the command it received from the power management server application 130. Alternatively, if some of the portable communication devices 104 have long range radio transceivers, the power management server application 130 may send a power management command to a portable communication device 104 via a cellular wireless link containing explicit commands for managing power usage of the battery 122 of the subject portable communication device 104.

In an embodiment, the mobile phone 102 may not be able to communicate with the power management server application 130, for example when the mobile phone 102 is out of wireless coverage by the BTS 108, and may autonomously generate a collaborative power management command. The power management client 118 on the mobile phone 102 may be configured by the power management server application 130 with rules to apply in such a situation (e.g., when the phone 102 is unable to communicate with the power management server application 130). Based on these rules and based on the information about the power and/or battery reserves, the power management client 118 may generate a collaborative power management command in lieu of receiving the same from the power management server application 130.

The commands to the devices 104 may command one or more of the devices 104 to enter a power conservation mode of operation. The commands to the devices 104 may command that one or more of the hardware components be turned off by the subject device 104. The commands to the devices 104 may command that one or more of the applications active on the subject device be deactivated. For example, one or more of the devices 104 may be commanded to turn off an application that is active on the mobile phone 102 (and hence executing the same application on the device 104 may be uselessly redundant). One or more of the devices 104 may be commanded to turn off applications executing in the background. One or more of the devices 104 may be commanded to reduce the frequency of transmissions using the short range radio transceiver 128, for example a frequency of status message transmissions. One or more of the devices 104 may be commanded to reduce a power amplification level of the short range radio transceiver 128. One or more of the devices 104 may be commanded to discontinue sending notifications or to discontinue sending notifications that are not high priority. The power management commands may accomplish their functions by invoking functions provided by the operating system of the devices 104 and/or by invoking functions provided by application programming interfaces (APIs) of one or more of the applications executing on the devices 104.

The power management client 118 on the mobile phone 102 also configures the phone based on the command received from the power management server application 130. The client 118 may command the phone to enter a power conservation mode of operation. The client 118 may deactivate some applications on the mobile phone 102, possibly based on awareness that the same application is active on one of the devices 102. The client 118 may reduce a power level of an amplifier of the long range radio transceiver 120. The client 118 may reduce the frequency with which it conducts handshaking with the BTS 108. The client 118 may temporarily change some settings on the phone 102, for example a brightness of a visual display, a display dimming time frame, and other settings. The power management commands may accomplish their functions by invoking functions provided by the operating system of the mobile phone 102 and/or by invoking functions provided by application programming interfaces (APIs) of one or more of the applications executing on the mobile phone 102.

When the activity is over—when the run is selected—the power management client 118 on the mobile phone 102 may send a power management command to the one or more portable communication devices 104 to resume normal power use mode (e.g., to discontinue power conservation mode of operation) and to reactivate hardware components of the devices 104 that had been deactivated. Alternatively, the power management server application 130 may send a power management command to the mobile phone 102 after the activity is over instructing the mobile phone 102 and/or the portable communication devices 104 to resume normal power use mode and to reactivate hardware components of the phone 102 and/or devices 104 that had been deactivated.

The completion of the activity may be detected based on expiration of a timer or triggered by detection of some other event. For example, detection of the position of the mobile phone 102 and/or one or more of the devices 104 at a particular position (a location of a car, a location of a personal residence, or other position) may act as a triggering event.

In an embodiment, the power management server application 130 generates power commands in response to the request from the mobile phone 102 based on a power management profile and/or on power management rules defined by a user of the mobile phone 102. For example, in an embodiment, the user may employ a user browser 134 to access a web application 136 hosted by the power management server computer 106 or hosted by another computer. The user may build a power management profile and/or define power management rules using a user interface provided by the web application 136. The user browser 134 may be executed on the mobile phone 102, on a desktop computer, on a laptop computer, on a tablet computer, on a notebook computer, or on some other execution platform that the use has available. The rules that the user enters and/or defines via the user interface provided by the web application 136 may be referred to in some contexts as pre-defined rules (e.g., they are pre-defined with reference to the point in time that the power management server application 130 accesses them to use in generating power commands).

The user may define or identify a plurality of different power management scenarios that may be selected when collaborative power management mediated or controlled by the power management server application is desired. The user may define, for example, an outdoor exercise mode or scenario. Alternatively, the user may define a more specific scenario, for example a running scenario or a plurality of running scenarios. For example, a marathon runner may define a plurality of different running scenarios for different training distances. For each defined power management scenario, the user may define parameters of the activity for example an estimated duration of time that the user will be away from battery charging facilities, mobile applications that the user desires to be active during the activity, and electronics that the user wishes to carry with him or her during the activity. For example, the user may define that he or she will carry or wear the mobile phone 102 and a fitness tracker device 104. Alternatively, the user may define that he or she will not carry the mobile phone 102 and will only carry or wear a fitness tracker device 104.

The user may define the power management scenarios to include a prioritization of active applications and/or active hardware components for the mobile phone 102 and/or the portable electronic devices 104. The prioritizations may be used by the power management server application 130 to choose what applications and which hardware components to deactivate during a collaborative power management session, for example when there is no power management solution that meets all the desired functionality of the user.

For example, it may be that allowing all the applications to execute on the portable communication device 104, as defined by the user in the power management scenario, during a 3 hour run is not feasible (e.g., the battery power of the portable communication device 104 would be depleted before the end of the run), and the power management server application 130 must choose to deactivate some, but not all, of these applications. This prioritization of active applications and active hardware components may be used by the power management server application 130 to make these choices. A power management scenario may also be referred to as a pre-defined set of power management rules. The user may define rules for what to do when unexpected situations arrive. For example, the user may define rules for what the power management server application 130 does when the user, contrary to a selected pre-defined scenario, forgets his or her mobile phone 102 in the car. This condition may be detected when a short range radio link between the mobile phone 102 and one or more of the portable communication devices 104 is broken (e.g., handshaking fails over this short range radio link due to the excessive distance between the mobile phone 102 and the subject device 104).

The power management client 118 on the mobile phone 102 may report battery power consumption information to the power management server application 130. The client 118 may transmit this battery report periodically or when requested by the server 130. The client 118 transmits this battery report one per hour, once per day, once per week, once per month, or on some other periodic interval. The power management client 118 on the mobile phone 102 may request (polling or pulling) battery power consumption information from the power management client 126 on the portable communication devices 104 periodically. Alternatively, the power management client 126 on the portable communication devices 104 may periodically report (pushing) battery power consumption information on their own initiative. The battery power consumption information may include battery power reserves over time as well as information on active applications and active hardware components. The information may identify firmware versions and/or software versions installed on the mobile phone 102 and/or the devices 104. The information may also include information about charging cycles. In an embodiment, one or more of the power management clients 126 on the portable communication devices 104 may transmit power data to the power management server application 130 without passing through the mobile phone 102, for example in the case that the subject portable communication device 104 has a long range radio transceiver and can establish a cellular communication link with the BTS 108.

In an embodiment, the power management server application 130 analyzes the battery power consumption information written to the data store 132 and scores mobile applications on their power efficiency. The power efficiency scores may be a general score for a mobile application and/or scores specific to execution platforms. For example, the power efficiency score for a given application may be different when executed on a mobile phone versus when executed on a particular portable communication device 104. In a preferred embodiment, power efficiency scores are linked to a particular model of a mobile phone 102 or to a particular model of a portable communication device 104. The power efficiency scores may also be linked to a firmware version and/or a software version of the mobile phone 102 or the device 104.

In an embodiment, the power efficiency score may be determined as a score relative to the power efficiency of other applications executing on the same platform. The power efficiency scores may be provided to third party developers of mobile applications so they can adapt their applications in future releases to align with peer applications. The power efficiency scores may be used by original equipment manufacturers (OEMs) of mobile phones 102 and/or by wireless communication service providers to choose what mobile applications to pre-load on the mobile phones 102 and/or the portable communication devices 104.

The power efficiency scores may also be used for other purposes. For example, the power efficiency scores may be indicated in an application store maintained by a wireless communication service provider, and users may choose applications to download and install on their mobile phones 102 and/or portable communication devices 104 based at least in part on their efficiency score. The users could also compare the power efficiency scores posted in the application store (which would be averages across many user devices) to the specific power efficiency score of applications on their own devices. If the user's power efficiency scores are significantly below the posted scores across most or all of their applications loaded on their device, the user could infer that his or her battery needs replacement or possibly that his or her device needs replacement.

The wireless communication service provider may offer incentives to subscribers to select power efficient applications versus power inefficient applications, as part of a company-wide mission to be environmentally friendly. The wireless communication service provider may analyze user behavior and determine an aggregate power saving across all subscribers that accrues from the incentive program to quantify the contribution to a clean environment.

Figure 2:
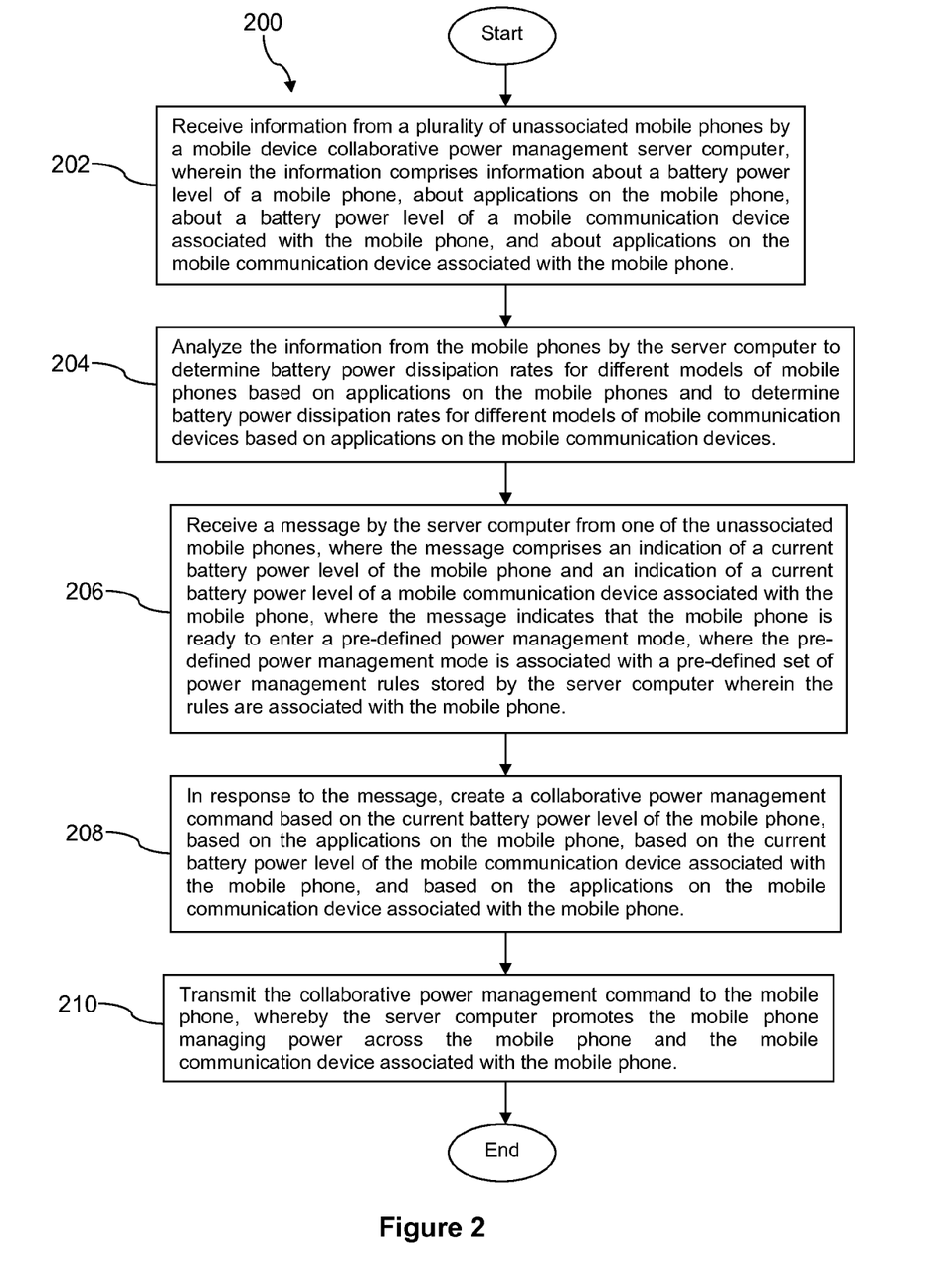
FIG. 2 is a flow chart of a method according to an embodiment of the disclosure.

Turning now to FIG. 2, a method 200 is described. At block 202, receive information from a plurality of unassociated mobile phones by a mobile device collaborative power management server computer, wherein the information comprises information about a battery power level of a mobile phone, about applications on the mobile phone, about a battery power level of a portable communication device associated with the mobile phone, and about applications on the mobile communication device associated with the mobile phone.

By unassociated it is meant the mobile phones are owned by different users. Two unassociated mobile phones may be a first mobile phone owned by a husband and a second mobile phone owned by a wife, where the husband and wife are married to each other. The husband may have one or more portable communication devices that are associated with the first mobile phone but not associated with the second mobile phone; and the wife may have one or more portable communication devices that are associated with the second mobile phone but not associated with the first mobile phone. The plurality of unassociated mobile phones may be any number of mobile phones, but it is expected that the number may be a relatively large number as the system 100 described above with reference to FIG. 1 is deployed and is adopted by the user community. It is hoped that the number of mobile phones participating in the collaborative power management system may exceed 10,000, exceed 100,000, or even in time exceed 1,000,000.

At block 204, analyze the information from the mobile phones by the server computer to determine battery power dissipation rates for different models of mobile phones based on applications on the mobile phones and to determine battery power dissipation rates for different models of mobile communication devices based on applications on the mobile communication devices.

At block 206, receive a message by the server computer from one of the unassociated mobile phones, where the message comprises an indication of a current battery power level of the mobile phone and an indication of a current battery power level of a mobile communication device associated with the mobile phone, where the message indicates that the mobile phone is ready to enter a pre-defined power management mode, where the pre-defined power management mode is associated with a pre-defined set of power management rules stored by the server computer wherein the rules are associated with the mobile phone. At block 208, in response to the message, create a collaborative power management command based on the current battery power level of the mobile phone, based on the applications on the mobile phone, based on the current battery power level of the mobile communication device associated with the mobile phone, and based on the applications on the mobile communication device associated with the mobile phone. At block 210, transmit the collaborative power management command to the mobile phone, whereby the server computer promotes the mobile phone managing power across the mobile phone and the mobile communication device associated with the mobile phone.

While the example used above to illustrate the quality of two mobile phones being unassociated spoke of unassociated mobile phones belonging to a husband and wife, it is contemplated that in some case the collaborative power management system may advantageously associate two mobile phones, for example two mobile phones of a husband and wife. Alternatively, the two mobile phones may belong to a parent and a child, to two college roommates, or to two business colleagues. In the situation of two or more associated mobile phones, the collaborative power management construct is extended so there may be a reduction in redundancy of functionality across the two or more associated mobile phones to the purpose of conserving battery life of mobile phones and/or portable communication devices during a time when recharging from mains power is not feasible. Thus, possibly two college roommates go on a hike. The mobile phone of the first roommate is commanded to keep voice communication functionality active but to disable GPS functionality. The mobile phone of the second roommate is commanded to disable voice communication functionality but to keep GPS functionality active. Thus, between the two mobile phones, the community of the two roommates has access to voice communication functionality and use of the GPS.

Figure 3:
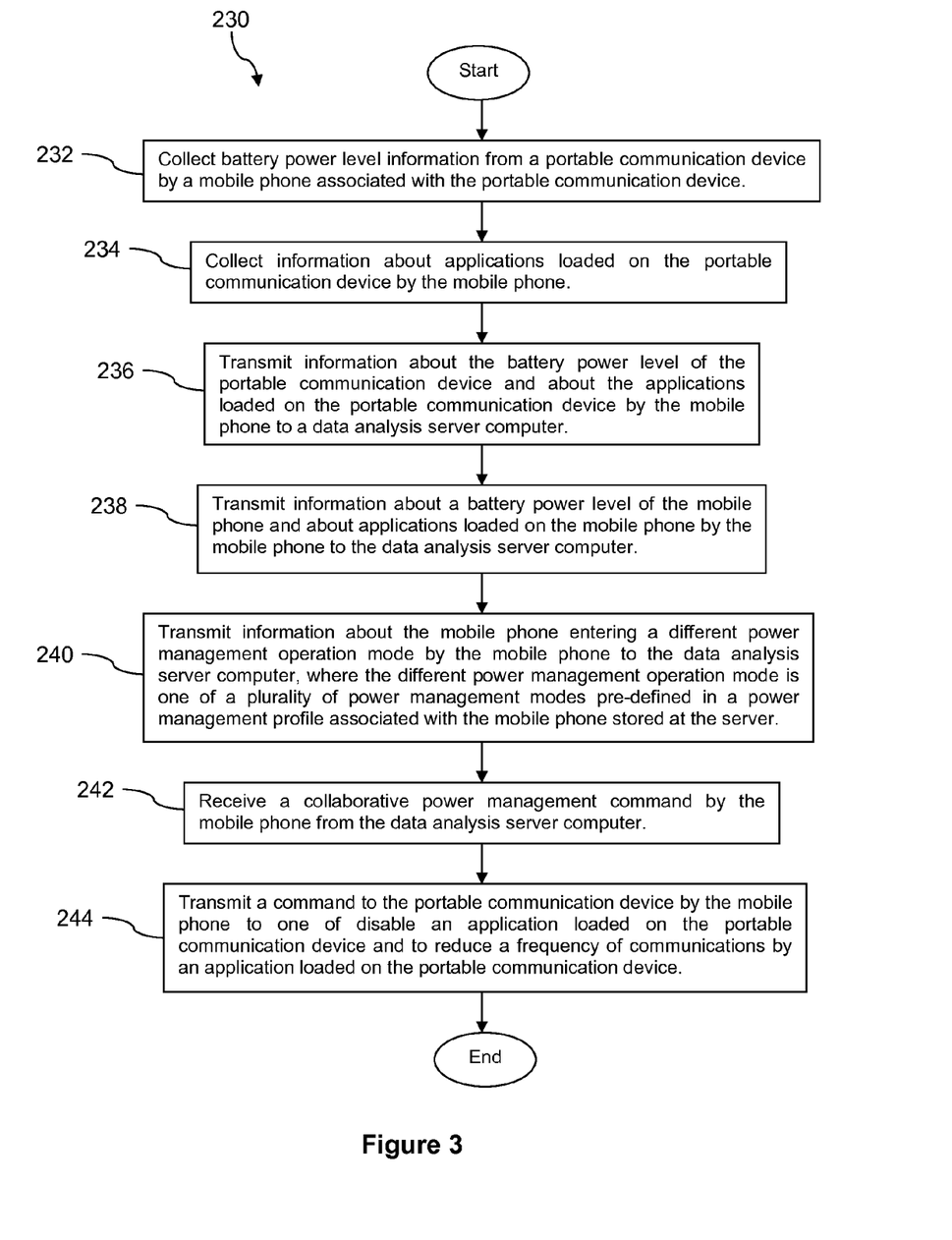
FIG. 3 is a flow chart of another method according to an embodiment of the disclosure.

Turning now to FIG. 3, a method 230 is described. At block 232, collect battery power level information from a portable communication device by a mobile phone associated with the portable communication device. At block 234, collect information about applications loaded on the portable communication device by the mobile phone. At block 236, transmit information about the battery power level of the portable communication device and about the applications loaded on the portable communication device by the mobile phone to a data analysis server computer.

At block 238, transmit information about a battery power level of the mobile phone and about applications loaded on the mobile phone by the mobile phone to the data analysis server computer. At block 240, transmit information about the mobile phone entering a different power management operation mode by the mobile phone to the data analysis server computer, where the different power management operation mode is one of a plurality of power management modes pre-defined in a power management profile associated with the mobile phone stored at the server. At block 242, receive a collaborative power management command by the mobile phone from the data analysis server computer. At block 244, transmit a command to the portable communication device by the mobile phone to one of disable an application loaded on the portable communication device and to reduce a frequency of communications by an application loaded on the portable communication device.

Figure 4:
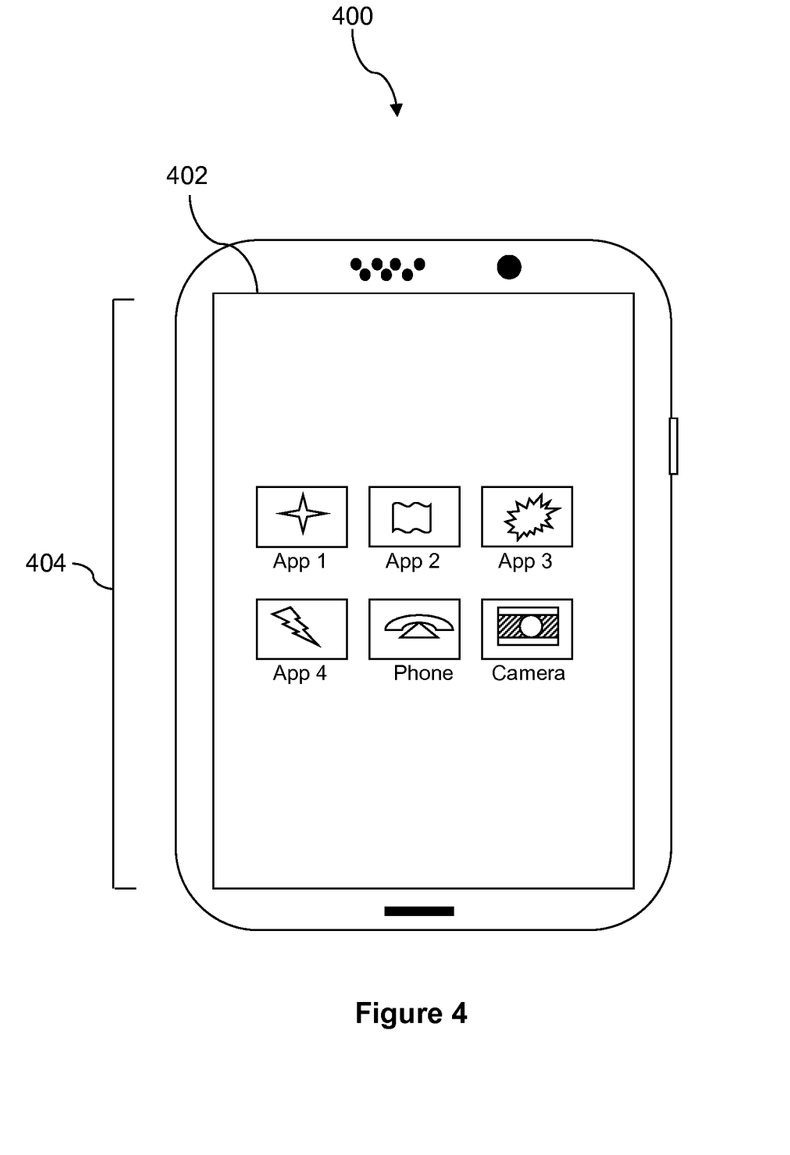
FIG. 4 is an illustration of a handset according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
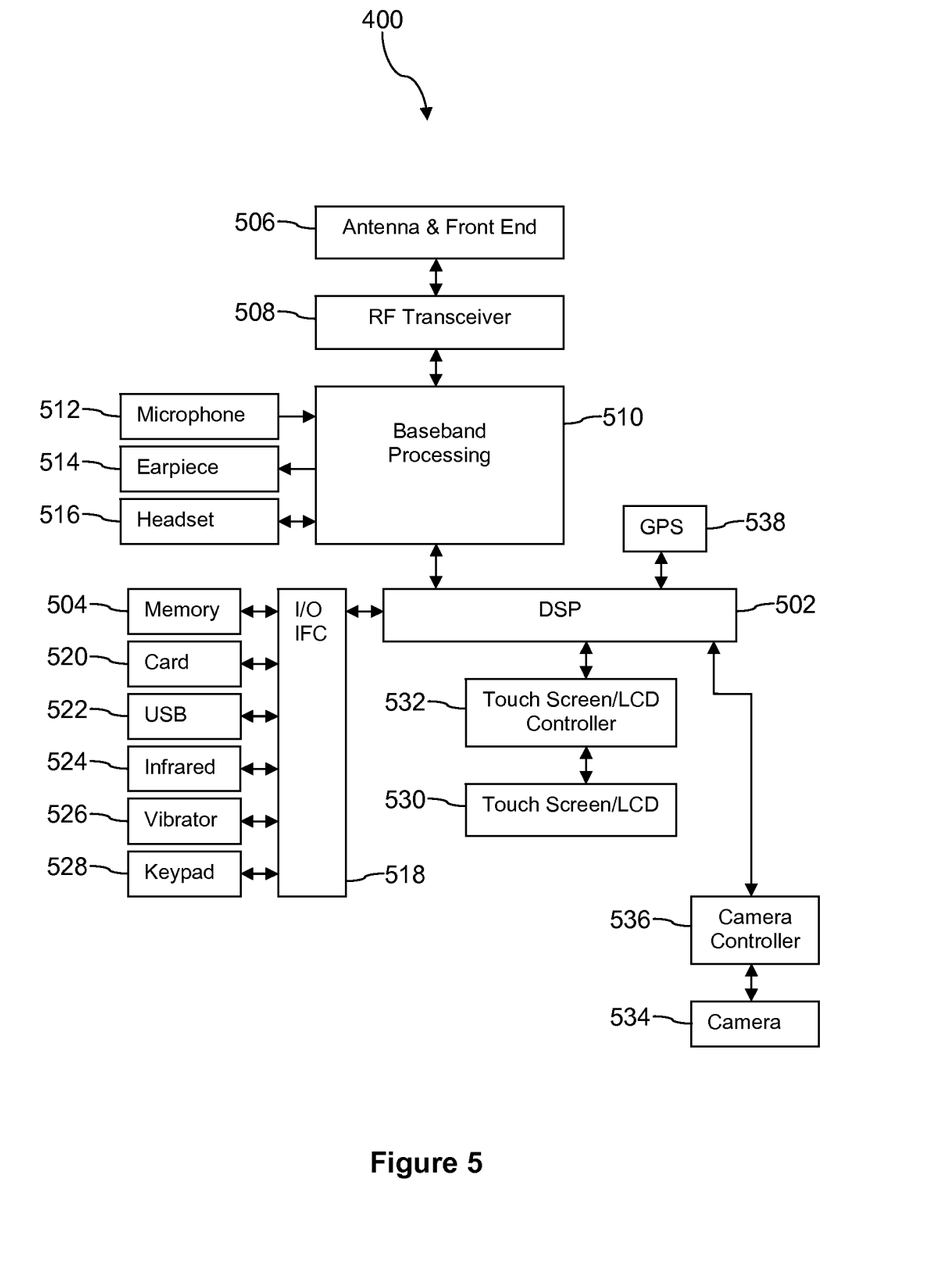
FIG. 5 is a block diagram of a hardware architecture of a portable communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. In an embodiment, one or more of the portable electronic devices 104 may have a hardware architecture that comprises at least some of the elements illustrated in FIG. 5. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
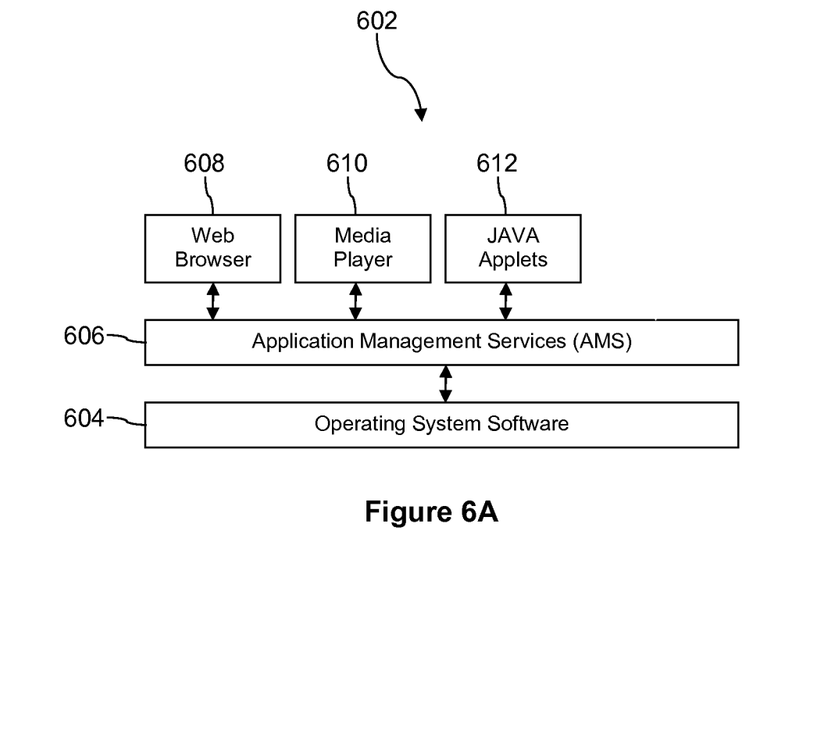
FIG. 6A is a block diagram of a software architecture of a portable communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
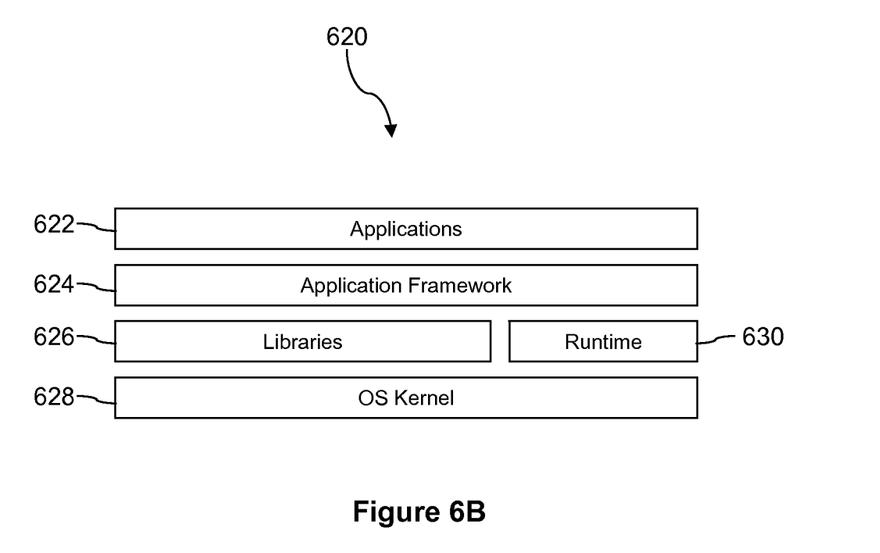
FIG. 6B is a block diagram of another software architecture of a portable communication device according to an embodiment of the disclosure

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
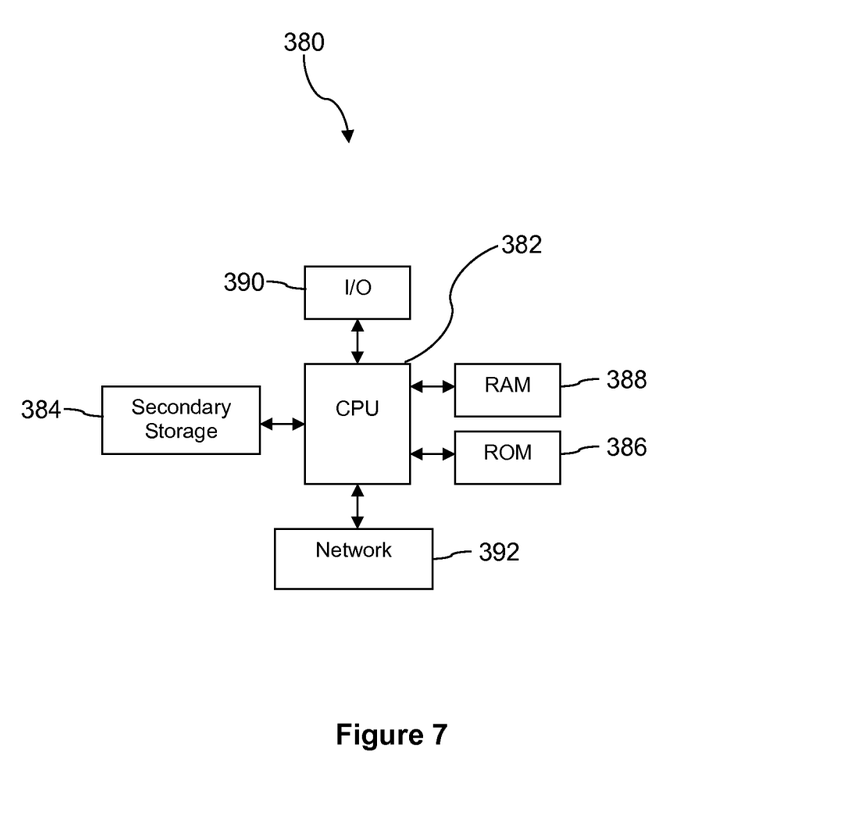
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile phone that coordinates power management across multiple communication devices, comprising:
    a processor;
    a memory;
    a long-range radio transceiver;
    a short-range radio transceiver; and
    an application stored in the memory that, when executed by the processor,
        receives a device power reserve information via the short-range radio transceiver from a portable communication device, wherein the portable communication device is different from the mobile phone,
        receives a device application usage information via the short-range radio transceiver from the portable communication device,
        transmits the device power reserve information, the device application usage information, a phone power reserve information, and a phone application usage information via the long-range radio transceiver to a data analysis server computer,
        receives power management instructions via the long-range radio transceiver from the data analysis server computer,
        creates a device power management command based on the power management instructions,
        transmits the device power management command via the short-range radio transceiver to the portable communication device, and
        configures the mobile phone to manage a battery power reserve of the mobile phone based on the power management instructions.

2. The mobile phone of claim 1, wherein the portable communication device is a wearable computer.

3. The mobile phone of claim 2, wherein the wearable computer is one of a computer watch, a computer insert in a shoe, and a headset computer.

4. The mobile phone of claim 1, wherein the short-range radio transceiver has a maximum range of about 300 feet and the long-range radio transceiver has a maximum range that exceeds three miles.

5. The mobile phone of claim 1, wherein the power management command commands the portable communication device to deactivate an application currently active on the portable communication device.

6. The mobile phone of claim 1, wherein the power management command commands an application on the portable communication device to contact a network application server associated with the application less frequently.

7. The mobile phone of claim 1, wherein the application transmits the device power reserve information, the device application usage information, the phone power reserve information, and the phone application usage information via the long-range radio transceiver to the data analysis server computer periodically.

8. A method of managing power collaboratively among a plurality of associated mobile communication devices, comprising:

receiving information from a plurality of unassociated mobile phones by a mobile device collaborative power management server computer, wherein the information comprises information about a battery power level of a mobile phone, about applications on the mobile phone, about a battery power level of a mobile communication device associated with the mobile phone, and about applications on the mobile communication device associated with the mobile phone;

analyzing the information from the mobile phones by the server computer to determine battery power dissipation rates for different models of mobile phones based on applications on the mobile phones and to determine battery power dissipation rates for different models of mobile communication devices based on applications on the mobile communication devices;

receiving a message by the server computer from one of the unassociated mobile phones, where the message comprises an indication of a current battery power level of the mobile phone and an indication of a current battery power level of a mobile communication device associated with the mobile phone, where the message indicates that the mobile phone is ready to enter a pre-defined power management mode, where the pre-defined power management mode is associated with a pre-defined set of power management rules stored by the server computer, and wherein the rules are associated with the mobile phone;

in response to the message, creating a collaborative power management command based on the current battery power level of the mobile phone, based on the applications on the mobile phone, based on the current battery power level of the mobile communication device associated with the mobile phone, and based on the applications on the mobile communication device associated with the mobile phone; and transmitting the collaborative power management command to the mobile phone, whereby the server computer promotes the mobile phone managing power across the mobile phone and the mobile communication device associated with the mobile phone.

9. The method of claim 8, further comprising determining a power efficiency score of a plurality of different applications based on the information from the mobile phones and transmitting one of the power efficiency scores to a developer of one of the applications.

10. The method of claim 8, further comprising determining a first power efficiency score for an application based on the information from the mobile phone for when the application executes on a mobile communication device and determining a second power efficiency score for an application based on the information from the mobile phone for when the application executes on a mobile phone.

11. The method of claim 8, further comprising determining a first power efficiency score for an application executed on a first model of mobile phone and determining a second power efficiency score for the application executed on a second model of mobile phone.

12. The method of claim 8, further comprising receiving input via a web page that defines a pre-defined set of power management rules and storing the pre-defined set of power management rules.

13. The method of claim 12, wherein the input received via the web page identifies a mobile phone by a mobile phone number.

14. The method of claim 8, wherein the pre-defined power management mode is an outdoor exercise mode and wherein the pre-defined management rules identify a time duration of an outdoor exercise activity.

15. A method of collaboratively managing battery power across multiple portable communication devices, comprising:

collecting battery power level information from a portable communication device by a mobile phone associated with the portable communication device;

collecting information about applications loaded on the portable communication device by the mobile phone;

transmitting information about the battery power level of the portable communication device and about the applications loaded on the portable communication device by the mobile phone to a data analysis server computer;

transmitting information about a battery power level of the mobile phone and about applications loaded on the mobile phone by the mobile phone to the data analysis server computer;

transmitting information about the mobile phone entering a different power management operation mode by the mobile phone to the data analysis server computer, where the different power management operation mode is one of a plurality of power management modes pre-defined in a power management profile associated with the mobile phone stored at the data analysis server computer;

receiving a collaborative power management command by the mobile phone from the data analysis server computer; and transmitting a command to the portable communication device by the mobile phone to one of disable an application loaded on the portable communication device and to reduce a frequency of communications by an application loaded on the portable communication device.

16. The method of claim 15, wherein the mobile phone communicates with the associated portable communication device via one of a Bluetooth radio link and a WiFi radio link.

17. The method of claim 15, further comprising presenting a user interface that comprises controls for selecting a power management operation mode.

18. The method of claim 15, wherein the collaborative power management command is received by the mobile phone via a long-range radio transceiver of the mobile phone.

19. The method of claim 18, wherein the long-range radio transceiver communicates with a base transceiver according to at least one of a code division multiple access (CDMA), a long term evolution (LTE), a global system for mobile communication (GSM), or a worldwide interoperability for microwave access (WiMAX) wireless communication protocol.

20. The method of claim 15, wherein the command transmitted to the portable communication device commands the portable communication device to disable a first application on the portable communication device where the first application is active on the mobile phone and further comprising disabling a second application on the mobile phone where the second application is active on the portable communication device.

* * * * *